May 30, 1967 — E. W. RASMUSSEN — 3,321,784
CATAMARAN TYPE OF WATER CRAFT
Filed Oct. 23, 1965 — 3 Sheets-Sheet 1

INVENTOR.
EDWIN W. RASMUSSEN
BY
Owen, Wickersham & Erickson
ATTORNEYS

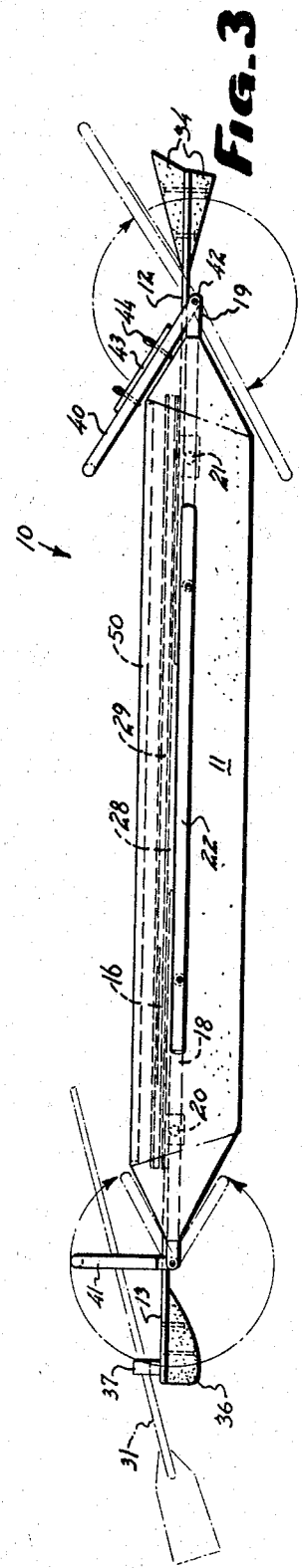

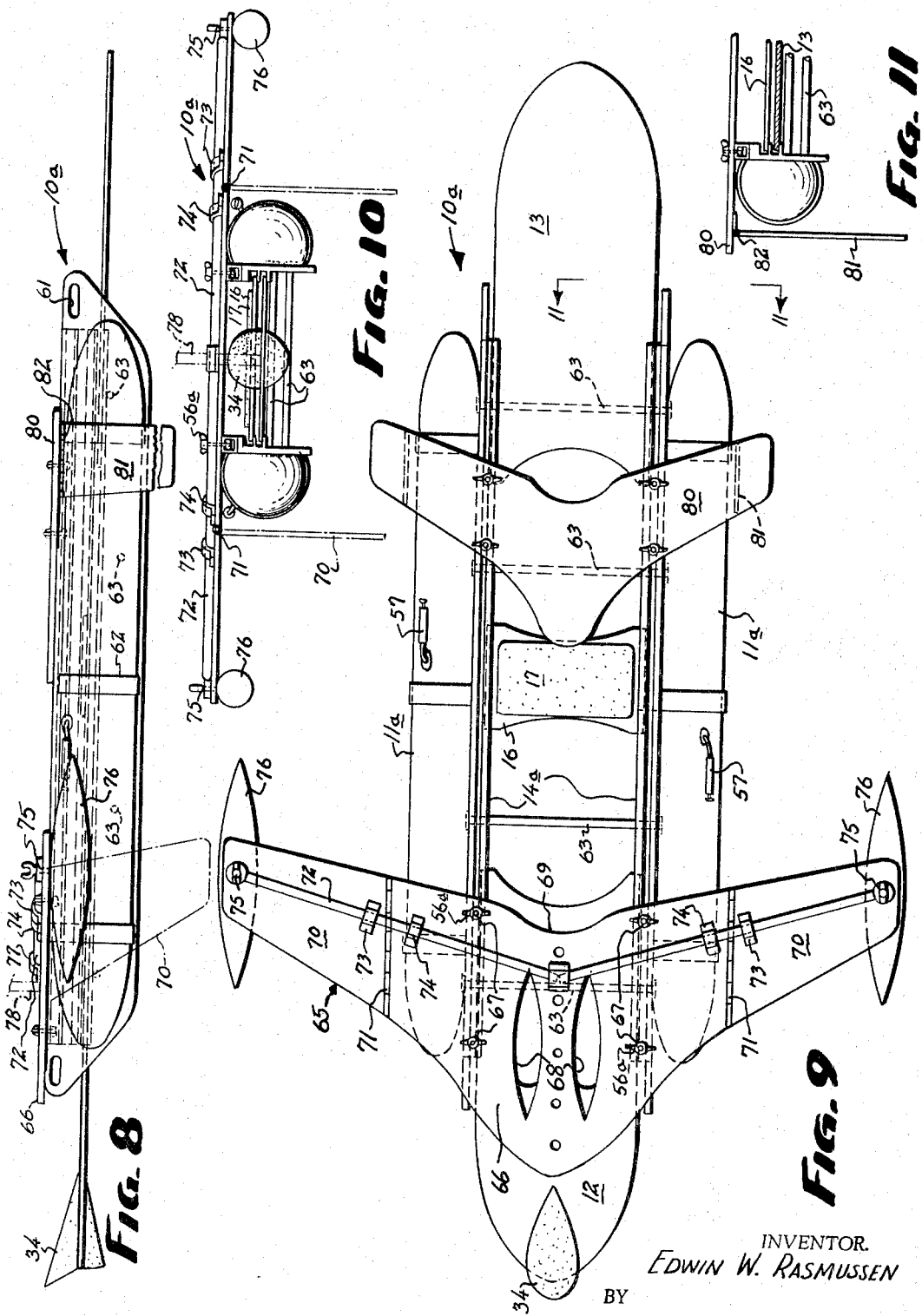

United States Patent Office 3,321,784
Patented May 30, 1967

3,321,784
CATAMARAN TYPE OF WATER CRAFT
Edwin W. Rasmussen, 1227-A 24th Ave.,
San Francisco, Calif. 94122
Filed Oct. 23, 1965, Ser. No. 503,970
25 Claims. (Cl. 9—1)

ABSTRACT OF THE DISCLOSURE

A water craft is provided having a center hull means supported between a pair of buoyant hull members, the center hull means being movable longitudinally in two sections to form an adjustable central opening between the buoyant hull members. Other features of the craft are included in combination with the aforesaid hull arrangement.

---

This invention relates to a relatively small water craft particularly well adapted to a variety of uses and modes of operation.

With an increase in boating activity and water sports which occurred in recent years, a need arose for a small but versatile water craft adaptable to a variety of water activities from surfining to river boating. A general object of the present invention is to provide a unique water craft that will fill this need, and more particularly, a craft that can be adapted quickly and easily for use as either a surfing or paddle board, a rowboat, a sailing boat, or simply an unsinkable raft. In addition to these more obvious uses in recreational boating activities, my invention is also highly useful wherever there is a need for a small, light, portable, and yet highly reliable vessel that can support and transport at least one man on water.

The aforesaid and other objects of my invention are accomplished by an arangement of elemnts which utilizes a twin hull or so-called catamaran configuration. Between a pair of buoyant, spaced apart hull members, my invention provides, in combination therewith, a plurality of center members which are adaptable in various forms for supporting the operator of the craft in either a standing, sitting, prone or a kneeling position and for controlling its handling characteristics when the craft is used in various ways. These center members are not only adjustable to various positions, but one or more of them can be easily removed and replaced with alternate members of slightly different structure and equipment that will enable the craft to be used in a different way. For example, in one configuration my craft can operate as a kayak with the aid of a paddle, and then with only slight changes it can be used as a surfboard, or with further modifications it can be used as a small sailboat, or for rowing or sculling with oars.

Another object of my invention is to provide a one-man water craft having the aforesaid versatility which, due to its unique construction, is unusually strong and yet relatively light and thus easily carried by one man or even a child.

A further object of my invention is to provide a small water craft having movable center sections which can be extended longitudinally to provide an adjustable central opening or hatchway and thereby enable the craft to be carried by a person standing between spaced apart buoyant hull members. When in the water the central hatchway provides a way for a skin diver, heavily laden with equipment, to board the boat easily from its underside without upsetting it. When not in use the extended center hull members are easily moved together so that the craft can be readily stored or transported in a relatively small space.

An outstanding advantage of my water craft is that it can maintain unusual stability and balance characteristics even when used in a wide variety of configurations for different water activities. This feature is made possible by the aforesaid unique arrangement of movable center hull members between buoyant hull members which enables the center hull to assume the optimum length for the conditions present and enables the pasenger to sit low near the waterline and to adjust his longitudinal position on the craft. The stability factor is also further enhanced by the fact that my craft provides a wide range of adjustment for either sail or rowing facilities in combination with and relative to the buoyant hull members, the center hull members and the passenger seat.

Still another object of my invention is to provide a water craft which, in addition to the aforesaid movable center hull members, has auxiliary longitudinally movable members for supporting a sailing mast or oarlocks at a level above the center hull members.

Yet another object of my invention is to provide a small one-man water craft which is particularly well adapted for ease and economy of manufacture.

Other objects, advantages and features of my invention will become apparent from the following detailed description and from the drawings in which:

FIG. 3 is a view in side elevation of the water craft shown in FIGS. 1 and 2;

FIG. 4 is a plan view of the water craft shown in FIGS. 1 and 2;

FIG. 5 is an end view in elevation taken along the line 5—5 of FIG. 4;

FIG. 6 is an enlarged fragmentary view in section taken along line 6—6 of FIG. 4;

FIG. 7 is an enlarged fragmentary view in section taken along line 7—7 of FIG. 6;

FIG. 8 is a view in side elevation of a modified form of water craft embodying the principles of the present invention;

FIG. 9 is a plan view of the water craft shown in FIG. 7;

FIG. 10 is a fragmentary view in end elevation of the water craft shown in FIGS. 7 and 8 with portions shown in dash lines to indicate their different positions; and FIG. 11 is a fragmentary view in section taken along the line 11—11 of FIG. 10.

Figure 1:
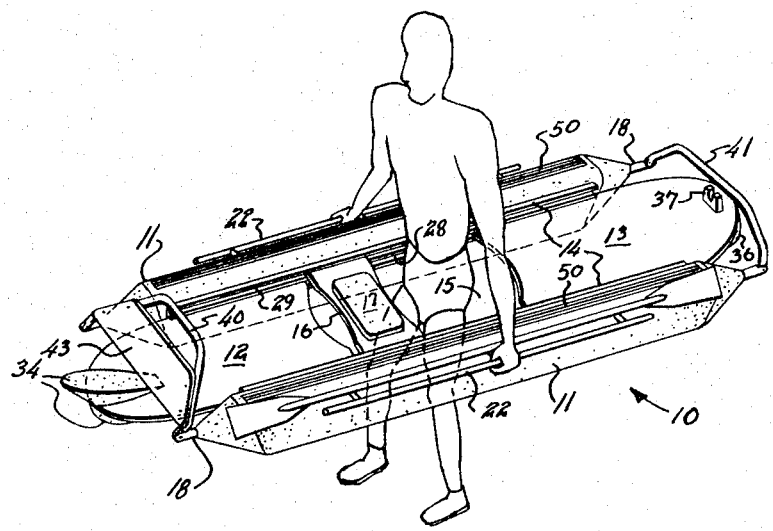
FIG. 1 is a view in perspective showing a one-man water craft embodying the principles of the invention as it appears when being carried on land.
Figure 2:
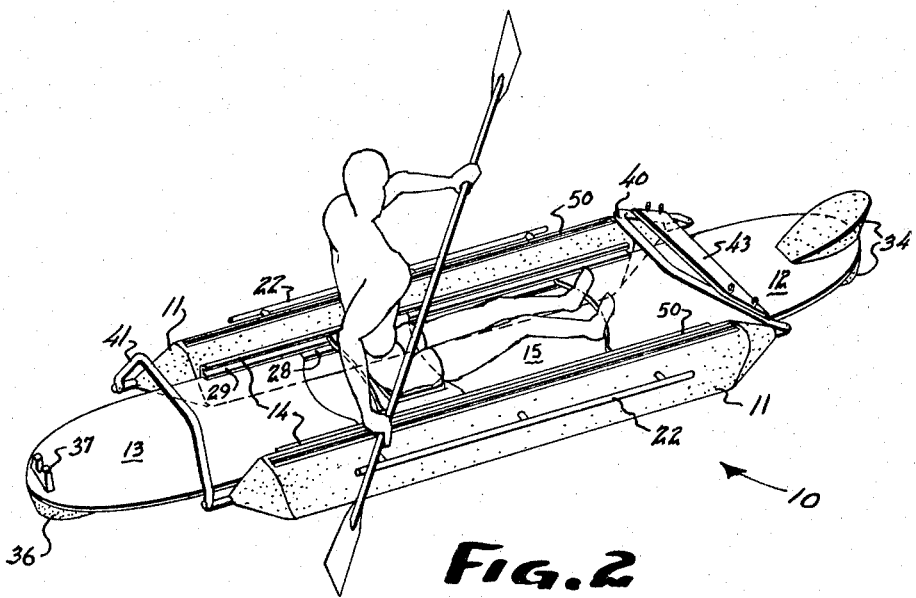
FIG. 2 is a view in perspective showing the one-man water craft of FIG. 1 as it appears when in the water and rigged for use as a kayak.

Referring now to the drawings in greater detail, FIGS. 1 and 2 show a water craft embodying the principles of the present invention and referred to by the numeral 10 as it appears in one form when in different modes of use. In FIG. 1, it is shown as it is normally carried in a convenient manner near the water, and in FIG. 2, it is shown with its passenger in a sitting-up position as commonly used when paddling a kayak, or the like. As the following description of my invention proceeds, it will become apparent that my water craft has an unusual versatility which enables it to assume several different operable configurations enabling it to be used for a wide variety of activities, some of which will be discussed in detail and others which will be suggested from the description.

In broad terms, the craft 10 comprises a pair of elongated, buoyant, pontoon-like hull members 11 that are generally parallel and retained at a predetermined spaced apart distance. These hull members may be shaped in any convenient manner, but generally they are cylindrical with either a circular or elliptical cross section and preferably with tapered ends that enable them to move through the water with a minimum of resistance. Situated between the spaced apart hull members are a pair of center board members 12 and 13 that are movable to various positions relative to the buoyant hull members and to each other to alter the configuration and balance of the boat when it is used in different ways. These bow and stern board members 12 and 13, as they may be called, are supported by a pair of side rail members 14, each of which is secured to the inner side of one of the pontoon-like hull members 11. Thus, when the craft is to be transported or stored the center board members are movable together which reduces its overall size to a minimum, but when the craft is in use the board members are usually extended well beyond the ends of the hull members and then locked in a position that provides a central opening or hatchway 15 between them. This extension of the central members 12 and 13 not only alters the water craft 10 to the configuration desired depending on its intended use, but it also enables a person to readily carry it on land by situating himself in a walking position between the central members, as shown in FIG. 1.

Also slidably mounted on the rails 14 at a level above the board members 12 and 13 is a short board section 16 having a pad 17 of yieldable material such as sponge rubber fixed thereto which serves as a seat that can be adjusted to any desired position longitudinally to support the passenger at different locations when the craft is used for sailing, rowing, surfing, or for other purposes. In FIG. 2, for example, the board section 16 is positioned for use when a passenger is sitting upright, but it can slide forward and serve equally as well as a chest support when a passenger is lying prone in a position for surfing.

Turning to the structural details of the water craft 10 as best shown in FIGS. 3–5, the buoyant hull members 11 are each made of a light aerated or foam plastic material such as foamed polystyrene. Using such material the hull members may be molded directly in the desired elongated shape with tapered ends or they may be shaped from standard billets of pre-molded material. Once formed, the hull members 11 may be covered with a hardened plastic surface material such as a plastic impregnated fiber glass. Extending longitudinally through each buoyant hull member is a central rigid frame member 18 which provides internal strength and stiffness and whose ends 19 protrude from each end of the hull member. Near opposite ends of each hull member are a pair of cross bracing members 20 that are connected to the longitudinal members 18 within the pontoons. To provide additional strength another pair of cross bracing members 21 may be spaced inwardly longitudinally from the previous cross bracing members 20 and are also secured to the longitudinal members 18 but extend from the outer sides thereof and from the outer sides of the pontoons 11. A pair of side bars 22 are connected to the protruding extensions 23 of the latter cross braces and serve as handles for the boat 10. All of the aforementioned frame members are preferably made from a light but strong metal tubing such as a suitable aluminum alloy. Also, these frame members are preferably assembled so that the craft can be quickly knocked down for transporting or for storage. In the form shown this is accomplished by tubular members 24 which branch at right angles from the longitudinal frame member 18 within each buoyant hull member 11 and project a short distance from its inside surface just under the rail members 14 and through a bearing-like bracket 25 which is welded, as shown at 23, to its lower flange (see FIGS. 6 and 7). The cross bracing members 20 and 21 all fit at their ends within the members 24 and are secured in place at each joint by a locking pin or threaded machine bolt 26 which extends transversely through the bracing member as well as the tubular member 24 and the bracket 25.

The rail members 14 extend along the inside of each hull member 11 for substantially its full length, and they may be secured thereto in any suitable manner. For example, in addition to being secured on the tubular projections 24 by the locking bolts 26, their rear face may be bonded directly to the buoyant hull by any of the well-known plastic bonding agents. In cross section, each rail has a pair of channels or grooves 28 and 29 which are horizontally aligned with the similar channels or grooves of the other rail on the opposite hull member 11. The bottom grooves 28 support the bow and stern center board members 12 and 13, and the upper grooves 29 support the movable seat 16. These center board members, which may be made of a suitable wood, metal or plastic material, each has a generally uniform width with preferably rounded or tapered outer ends. At least along their side edges, the center board sections have a thickness that is less than the width of the grooves 28 and 29 so that they will slide easily when it is necessary to adjust their longitudinal position. As shown in FIG. 6, the edges of both the bow and stern boards are provided with holes 30 at predetermined spaced apart intervals which match similarly spaced apart holes 32 in the rails 14. This enables both board members 12 and 13 to be retained in any preselected longitudinal position by easily removable pins 33. These locking pins are preferably installed near the ends of the hull members so that they will not interfere with the sliding seat 16 within the upper grooves 29.

As shown in FIG. 4, the inner end edges 38 and 39 of the fore and aft center board sections 12 and 13 are curved inwardly so when they are spaced apart even a small distance, the hatchway 15 becomes large enough to accommodate a person in a stand-up position, as seen in FIG. 1, thereby enabling the boat to be easily carried in a well-balanced position. When the boat is in the water the bow and stern board sections can be extended further to the desired position and locked by the pins 33.

At the outer end of the bow center board section 12, I may utilize a combination wave deflector and auxiliary buoyancy member 34. Essentially this member comprises a pair of blocks of buoyant material arranged both above and below the end of the bow board 12 and secured thereto as by bolts 35 so that they can be easily removed or reinstalled. A similar buoyancy block 36 is secured to the end of the stern board member 13 and preferably on its underside so that the upper side can accommodate an oarlock 37 for a steering oar 31, or the like. All of the buoyant blocks are preferably tapered with a somewhat teardrop shape in plan form so they not only provide buoyancy but also serve to deflect waves when the craft is in rough water conditions. The buoyancy on the ends of the center boards prevents them from "digging in" during surfing, for example, and since the board members are adjustable longitudinally, the effectiveness of the buoyancy members can be increased or decreased to suit the existing water conditions and the mode of operation of the craft.

Attached to both ends of the extended portions 19 of the longitudinal frame members 18 on the craft 10 are U-shaped tubular support members 40 and 41. These latter members are coupled by standard hinge type elbow fittings 42 which limit the movement of the members 40 and 41 in both up and down positions and which can be tightened to retain them at intermediate positions. In the down position (FIG. 3) these support members extend back beneath the craft and retain the pontoons off the ground when the craft is on land, and in the up position, when the craft is in use, they serve as a means for holding onto the craft. A deflecting board 43 comprising a thin sheet of wood, metal or plastic may be secured by a series of bolts 44 to the forward member 40 and when fixed at intermediate position as shown in dotted lines in FIG. 3, it serves to deflect larger waves that would otherwise adversely affect the craft, such as when it is used in heavy surf.

Along the tops of the buoyant hull members 11 and preferably embedded therein, I may provide a pair of longitudinally extending top rail members 50. These latter rail members may be utilized for supporting auxiliary components to facilitate use of the craft for sailing, rowing or other modes of operation, as will be described more fully with respect to other embodiments described below. More specifically, they provide a means for securing an auxiliary deck member 51 in a transverse position across the hull members. Although various forms of attaching means or rail members could be used, the ones shown, which are of a commercially available type, each have a generally U-shaped cross section with inwardly turned flanges 52 along an upper open side. A locking bolt 53 extends downwardly between the flanges and is threadedly engaged by a nut 54 which is urged upward by an internal spring 55. When the bolts 53, which are on both opposite rail members and which extend upwardly through the auxiliary deck member 51, are loosened the latter can be moved longitudinally to any position. Conversely, when the bolts are tightened by a head portion 56 on the upper side of the deck member, it becomes secured firmly in place. The advantages in being able to make such an easy adjustment of the auxiliary deck member will become apparent from the description below of other embodiments and the invention.

A modified form of my invention designated by the numeral 10a is shown in FIGS. 8 to 10. In this embodiment I provide a pair of rigid frame or spar members 60, as I prefer to call them, on each of which is mounted a buoyant hull member 11a. These spar members may be made from any suitable material such as plywood or a light, strong plastic, and near each corner they may be provided with an elongated opening 61 for use as a hand hold. The buoyant members shown here are made from some flexible, airtight material so that each is inflatable, and they may each be secured to one spar member 60 by suitable straps 62 of flexible material which are anchored to the frame members in a suitable manner. However, the buoyant members 11a may again be made of molded lighter-than-water foamed plastic material, in which case they can either be bolted or strapped to the spar members 60. If the hull members 11a are the inflatable type they may each be provided with a separate cylinder 57 of compressed air attached through a valve at an inlet opening in the well-known manner. The two spar members 60, with their buoyant hull members 11a attached, are connected together and held at a spaced apart parallel position by a series of cross brace members 63 which may be merely long bolts or rods with threaded ends secured by standard lock nuts.

Fixed to or integral with one side of each spar member 60 is a supporting rail member 14a which is similar in shape and function to those used on the craft 10, each having a pair of grooves 28a and 29a. Slidably supported in the lower grooves 28a of opposing rail members is a bow board 12a and a stern board 13a which are also similar to the bow and stern boards 12 and 13. The upper grooves 29a support an adjustable seat 16a as previously described.

Fixed to each spar member 60 near its upper edge is a top rail member 50a which may be similar to those installed on the hull members 11 as shown in FIG. 6.

The craft 10a is operable in the same manner as the earlier embodiment of FIGS. 1-7, but because of the different structural arrangement of components it can be disassembled or knocked down into a less bulky package. For example, the rigid spar members 60 may be made in sections which are spliced together, and with the hull members 14a being deflatable, the entire craft will require little space when disassembled. Yet, it can be quickly assembled without the need for complicated tools and skilled labor and put into operating condition.

The foregoing description of the two embodiments of thet present invention illustrates my underlying concept of construction and function which provides a versatility in water craft heretofore unavailable. In essence, this concept entails the use of levels supporting adjustable components between a pair of spaced apart or catamaran hull members. At the first or lowest level the bow and stern board members provide a basic structure between the hull members and are movable to extend the length of the craft and enlarge the central hatchway 15. The second level is the seat 16 which is also movable longitudinally to any position to support the passenger. The third level is for the upper or auxiliary deck member which may be supported on the hull members 11 and attached to a first level member and which provides support for a variety of auxiliary attachments when the craft is used in various configurations for different water activities.

The embodiment of my water craft 10a is shown in combination with a particularly unique upper deck or auxiliary deck member, although it could as well be used in combination with the craft 10, previously described. As shown, this deck member, designated by the numeral 65, has a center section 66 that may be fixed at any predetermined longitudinal position to the top rail members 50a by locking bolts 53 having a lead portion 56 for tightening, as shown in FIG. 6.

The deck member 65 affords a means for utilizing my craft efficiently for either sailing or rowing. The center section 66 is a boardlike member having generally a V-shape as it lays transversely across the spar members and the buoyant hull members. Spaced apart on opposite sides of its center line are a pair of elongated openings 68 through which a person's feet can be placed when in the rowing position. The inwardly curved trailing edge 69 of the center section allows the rower to get as close to the center section as is necessary for the proper rowing position. Attached to the center section 66 along each of its outer edges is an extended upper deck member 70. This latter member is preferably attached to the center section 66 by means of a hinge 71 which enables it to move from an up position co-planar with the center section to an alternate down position at substantially a right angle to the center section. These extended deck members may also be made of rigid sheet material having the same or even less thickness as the center section, and they are swept back in plan view from the bow end of the boat as seen in FIG. 8. To hold the extended deck members 70 in the up position any suitable locking system can be used. As shown, I utilize a tubular support or bracing member 72 which is slidably retained by a series of aligned brackets 73 and 74 fixed to the center and extended sections, respectively. At the outer end of each support brace 72 is a swivable oarlock 75 which will support an oar for rowing the craft. The bracing members 72 are extending to various positions and a suitable means, such as a set screw (not shown) on the brackets 73 or 74, may be provided to lock them in the desired position. Thus, it is seen that the auxiliary deck member 65 can be adjusted to the ideal position in all respects to accommodate a rower in his most efficient position. At the outer tips of each extended section 70 is an outrigger float member 76 which is preferably used in the rowing configuration to stabilize the craft. These float members are preferably formed of foamed plastic material and are removably attached by a stud fitting embedded within the float and bolted to the extended deck member.

When the deck member 65 is utilized on a craft in the sailing configuration, the extended members 70 (with the outrigger floats removed) are folded downward as shown in FIG. 9. They thus become lee boards which stabilize the craft under sail. A series of openings 77 located along the center line of the center section 66 of the upper deck member provides alternate positions for receiving a mast 78 which may be supported as previously described. In the sailing configuration the seat 16a is moved to an aft position to improve the balance of the craft.

As shown in FIGS. 9 and 11, I may provide a modified seat 80 combined with a pair of aft lee boards particularly adapted for use when the craft is rigged for sailing. This seat assembly has the same general shape in plan form as the forward auxiliary deck member 65, and its swept-back ends extend outwardly beyond the buoyant hull members 11. It is also attached to the top rails in the same manner as the deck member 65 and is therefore adjustable to any position longitudinally that provides the best balance and stability for the craft. This position may vary depending on such factors as the weight of the passenger, the wind velocity, the water roughness and the position of the sail on the craft. Unlike the deck member 65, this seat 80 is preferably not hinged itself but is rigid along its length so that it can support a passenger who wishes to sit well outboard to counteract the sail force when underway. However, the lee boards 81 are connected by hinges 82 of a suitable type on the underside of the seat along lines spaced inwardly from its ends and just outside the buoyant hull members (See. FIG. 11). In the down position these lee boards 81 afford added stability near the stern of the craft during normal sailing operations. When the seat 80 is used, the other seat 16 can either be removed from the rails 14a, or it can be locked by a pin similar to the pins 33 used for the center boards and thus be used as a footrest. Also, when the seat 80 is used other auxiliary deck members without lee boards can be used to support a sailing mast.

From the foregoing it should be apparent that the present invention provides a highly versatile one-man water craft that can be used in a variety of ways with ease and safety because of my unique multiple level concept in combination with catamaran hull members. The side rail members on the inside edges of the buoyant hull members provide the lower level at which the center board members can be adjusted and the midlevel on which the seat is supported and movable to various positions as the craft is used for different purposes. The upper rail members 50 also support a variety of forms of auxiliary deck members at a third level which are also adjustable longitudinally to provide a means for maintaining the optimum balance and stability. At all three levels the particular components shown can be easily replaced with alternate forms thereof to provide still greater versatility of operation. For example, although it has not been shown, a midlevel section instead of a seat may provide a support for a small engine with a propeller drive shaft extending downwardly through central hatchway 15.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A water craft adaptable for use in a variety of ways, comprising in combination:
   a pair of buoyant hull members;
   means forming a pair of grooves extending horizontally along the inside of each of said hull members;
   and a plurality of center hull members retained in said grooves between said buoyant hull members, said center hull members being movable longitudinally to extended positions to support the craft when it is used.
2. A water craft adaptable for use in a variety of ways comprising in combination:
   a pair of elongated and buoyant hull members fixed in a substantially spaced apart parallel position with respect to each other;
   a plurality of elongated and longitudinally movable center members located between and extending generally parallel to said hull members;
   means for supporting said center members for movement to predetermined longitudinal positions relative to each other and to said hull members;
   and means for locking said center members at preselected positions on said latter supporting means.
3. The craft as described in claim 2 wherein said supporting means comprises a pair of rail members forming grooves extending horizontally along the inside of each of said hull members, said center members being retained in said grooves.
4. The craft as described in claim 3 wherein said center members include a bow board member, a stern board member and an intermediate board member, each being movable longitudinally within limits in said grooves and being thereby adjustable to predetermined positions relative to each other and to said buoyant hull members.
5. The craft as described in claim 2 wherein said center members include a bow board member and a stern board member supported at a first lower level in one pair of grooves and an intermediate board member supported for longitudinal adjustment in another pair of grooves at a second level above said bow and stern board members.
6. The craft as described in claim 5 including a longitudinally adjustable auxiliary deck member located on top of said buoyant hull members at a third level above said intermediate board member; and means for supporting said auxiliary deck member and for locking it in place at various longitudinal positions on said craft.
7. The craft as described in claim 2 wherein said buoyant hull members are each comprised of a rigid central longitudinal tubular frame member embedded in a mass of lighter-than-water foam plastic material; branch frame members extending at right angles from said longitudinal frame members; cross frame members extending between said branch frame members; and means for connecting said cross frame members and said branch frame members together to hold said buoyant hull members at a predetermined distance apart.
8. The craft as described in claim 2 wherein said means for supporting said center members includes a pair of rigid spar members having inner rail portions each forming a pair of grooves within which said center members are slidably retained; and means for securing said buoyant hull members to said spar members.
9. The craft as described in claim 7 including a U-shaped support member pivotally connected to extended end portions of said tubular members, and means limiting the degree of foldback of said support member both above and below said center board members.
10. The craft as described in claim 4 including a block of buoyant material secured to the outer end of said movable bow board for controlling the stability of said craft.
11. A knockdown, catamaran type water craft comprising:
   a pair of longitudinally extending, relatively rigid spar members;
   means for retaining said spar members in parallel spaced apart relationship;
   an elongated buoyant float member secured to one side of each spar member;
   a pair of center hull means movable longitudinally between said spar members;
   support means on each spar member for retaining said center hull means;
   and means for locking said center hull means in said support means at predetermined longitudinal positions.
12. The water craft as described in claim 11 wherein said elongated buoyant float members are inflatable, collapsible airtight containers; and strap means attached to said spar members for retaining said float members thereto.
13. The water craft as described in claim 11 wherein said support means are rail members having flanges forming a pair of parallel longitudinally extending grooves for retaining said center hull means.
14. The water craft as described in claim 11 wherein said center hull means comprises a bow board and a stern board of uniform width movably supported in one pair of grooves at a lower level; and means for locking said board members at predetermined longitudinal positions on said spar members; whereby said board members can be retained apart with a space between them when the craft is afloat or closer together to reduce the overall length of the craft and facilitate its storage.

15. The water craft as described in claim 14 including an auxiliary deck member extending across said spar members; and means for supporting said auxiliary deck member and for locking it at preselected longitudinal positions on said craft.

16. The water craft as described in claim 15 wherein said auxiliary deck member includes outrigger means extending outwardly from opposite sides of said spar members; an elongated float member attached to the underside and oarlock means mounted on the upper side of said outrigger means at each outer end thereof.

17. A water craft adaptable for use in a variety of ways comprising in combination:
 a pair of elongated, spaced apart buoyant hull members;
 longitudinally movable bow and stern center board members located between said buoyant hull members;
 means on each of said hull members for supporting said board members at predetermined longitudinal positions relative to each other and to said hull members;
 means for locking said center board members at preselected extended positions;
 an auxiliary deck member extending transversely across and supported on said hull members;
 and outrigger means fixed to said auxiliary deck member.

18. The water craft as described in claim 17 wherein said auxiliary deck member comprises a flat center deck section and extended end sections hingedly connected thereto on opposite sides of the craft, said end sections being foldable downwardly to a right angle position with respect to said center deck section, thereby functioning as lee boards when the craft is used for sailing.

19. The water craft as described in claim 18 including means for maintaining said end deck sections in an up position substantially co-planar with said center section; and oarlock means near the extreme ends of said end sections.

20. The water craft as described in claim 19 including a pair of elongated openings in said center deck section, said end sections being swept rearward from the bow of said craft in plan form so that said oarlock means can be located outwardly from the sides of the rower when his feet are placed in said elongated openings.

21. The water craft as described in claim 20 including buoyant float members fixed to the ends of said end sections when they are in the up position.

22. A water craft comprising:
 a pair of buoyant, elongated hull members spaced a predetermined distance apart;
 a pair of center board members located at a first lower level and supported between said hull members;
 a first auxiliary deck means above said centerboard members and extending transversely across said buoyant hull members;
 inner rail means for supporting said center board members at a plurality of alternative preselected longitudinal locations;
 and upper rail means for supporting and locking said auxiliary deck means at preselected longitudinal positions.

23. The water craft as described in claim 22 including means on said first auxiliary deck means for supporting a mast; and a second auxiliary deck means supported on said upper rails.

24. The craft as described in claim 23 wherein said second auxiliary deck means comprises a rigid seat board extending across and slightly outboard of said buoyant hull members, and foldable lee board members hingedly connected to the underside of said rigid seat board and adapted to extend vertically downward near said buoyant hull members.

25. A water craft comprising:
 a pair of buoyant, elongated hull members;
 means for connecting said hull members together in a parallel spaced apart arrangement;
 a pair of movable center board members located at a first lower level between said hull members;
 an intermediate deck member located at second level above said first level;
 auxiliary deck means forming a third and upper level above said latter means and extending transversely across said buoyant hull members;
 means for supporting said center board members and said intermediate deck member for longitudinal movement between said hull members, thereby facilitating their adjustments to a plurality of alternative preselected positions when said craft is used in various ways;
 said auxiliary deck means having downwardly movable outboard sections;
 and means on said auxiliary deck means for locking said outboard sections in either a substantially horizontal up position or a substantially vertical down position.

References Cited

UNITED STATES PATENTS

| | | | |
|---|---|---|---|
| 2,332,009 | 10/1943 | Perri | 9—2 X |
| 2,775,218 | 12/1956 | Kapusnik | 9—1 X |
| 2,916,748 | 12/1959 | Stahmer | 9—1 X |
| 3,273,528 | 9/1966 | Kiefer | 114—61 |

FOREIGN PATENTS

| | | |
|---|---|---|
| 807,596 | 7/1951 | Germany. |

MILTON BUCHLER, *Primary Examiner.*

T. M. BLIX, *Assistant Examiner.*